(12) United States Patent
Choi et al.

(10) Patent No.: US 7,953,301 B2
(45) Date of Patent: May 31, 2011

(54) APPARATUS AND METHOD FOR SEARCHING FOR 3-DIMENSIONAL SHAPES

(75) Inventors: Jeongkil Choi, Bucheon (KR);
Youngchul Lee, Incheon (KR); Chaeho Lim, Incheon (KR)

(73) Assignee: Korea Institute of Industrial Technology, Chonan-si (KR)

( * ) Notice: Subject to any disclaimer, the term of this patent is extended or adjusted under 35 U.S.C. 154(b) by 61 days.

(21) Appl. No.: 12/435,228

(22) Filed: May 4, 2009

(65) Prior Publication Data

US 2009/0237397 A1    Sep. 24, 2009

Related U.S. Application Data (62) Division of application No. 11/271,983, filed on Nov. 14, 2005, now Pat. No. 7,551,807.

(51) Int. Cl.
*G06K 9/36* (2006.01)
*G06K 9/54* (2006.01)
*G06K 9/20* (2006.01)

(52) U.S. Cl. .......................... 382/305; 382/285; 382/312

(58) Field of Classification Search .................. 382/115, 382/118, 154, 173, 181, 203, 218, 285, 305, 382/312; 707/3, 100; 345/419, 582
See application file for complete search history.

(56) References Cited

U.S. PATENT DOCUMENTS

| | | | |
|---|---|---|---|
| 5,841,894 | A | 11/1998 | Horie |
| 6,038,074 | A | 3/2000 | Kitaguchi et al. |
| 6,603,867 | B1 | 8/2003 | Sugino et al. |
| 6,927,862 | B2 | 8/2005 | Iwasaki |
| 7,092,563 | B2 | 8/2006 | Shiratani |
| 7,188,103 | B2 | 3/2007 | Furuhashi et al. |
| 7,324,670 | B2 | 1/2008 | Kozakaya et al. |

*Primary Examiner* — Kanji Patel
(74) *Attorney, Agent, or Firm* — Sughrue Mion, PLLC

(57) ABSTRACT

Disclosed herein is an apparatus and method for searching for 3-dimensional shapes. The apparatus includes, an input means, an acquisition module, a storage means, a comparison and search module, an output means, and control means. The input means receives 3-dimensional image data. The acquisition module acquires a 2-dimensional image data group about the shape of an object represented by the 3-dimensional image data. The comparison and search module compares the respective data of the acquired 2-dimensional image data group with the respective data of the 2-dimensional image data groups that are previously stored in the storage means, and searches for 3-dimensional image data. The control means controls the modules and the means.

8 Claims, 11 Drawing Sheets

APPARATUS AND METHOD FOR SEARCHING FOR 3-DIMENSIONAL SHAPES

CROSS-REFERENCE TO RELATED PATENT APPLICATION

This is a divisional of U.S. application Ser. No. 11/271,983 filed Nov. 14, 2005 now U.S. Pat. No. 7,551,807, which is incorporated herein by reference in its entirety.

BACKGROUND OF THE INVENTION

1. Field of the Invention

The present invention relates generally to an apparatus and method for searching for 3-dimensional shapes and, more particularly, to an apparatus and method for searching for 3-dimensional shapes, which convert a 3-dimensional shape, such as the shape of a metallic mould product, into 2-dimensional image data and quickly and accurately search for an identical or similar 3-dimensional shape using the 2-dimensional image data.

2. Description of the Related Art

Recently, with the development of computer and communication technology, demand for multimedia information service is increasing. The necessity for research into 3-dimensional shape searching technology, which can be used to search still images and moving images through the Internet, Video On Demand (VOD) service to be used for broadcast production, an electronic library, a medical field (tele-medicine and medical image search) and the like, is increasing. In the early stages of research, a method of a user's directly adding indices to all the 3-dimensional shapes of an object targeted for searching, for example, a kettle having one of various shapes and a metallic press mould for an automobile, was used. For example, information about the bottom diameter of a kettle, the diameter of the lid of the kettle, and the height of the kettle (information about a shape) is indexed in text form, and 3-dimensional image data is prepared using the indexed information and are stored in a storage means, such as a computer.

Thereafter, in order to search for an object whose information previously stored, the user directly inputs the article name of the object and information about the shape thereof through the input means of the computer, so that the object corresponding to the input information can be searched for. The method of searching using the information in text form can be effective when the number of objects to be stored is small and the amount of information about the shapes of the objects is small. However, when the types and number of objects increase, or information about the shapes of respective objects is complicated, a lot of time is required to search for an identical or similar object and search accuracy is lowered. Furthermore, since the target of the search is not an actual object but information in text form, there is a problem in that information about a shape represented for a specific object can be different for different users. Furthermore, the problem is further serious when the shape of an object cannot actually be represented in text from. Furthermore, since the user must directly input respective information about the shapes of all the objects, efficiency is lowered from the point of view of consumed time and cost.

Meanwhile, there is another method of performing search in such a manner that the 2-dimensional images of objects that are produced at a specific time, like pictures, are previously stored in a computer, and an identical or similar 2-dimensional image stored in the computer is searched for using the 2-dimensional image of an object in question. This method is an objective and effective method, in contrast to the above-described method of comparing a 3-dimensional shape with text information.

However, when 2-dimensional images being used, for example, the face shape of a human and the shape of an automobile, vary with the user's viewing angle, the method cannot be used as a search method because consistency cannot be maintained. Furthermore, the method cannot be used at all in the case where a vacant space, which cannot be viewed from the outside, exists inside an object.

SUMMARY OF THE INVENTION

Accordingly, the present invention has been made keeping in mind the above problems occurring in the prior art, and an object of the present invention is to provide an apparatus and method for searching for 3-dimensional shapes, which accurately and quickly search for the 3-dimensional shapes of objects.

Another object of the present invention is to provide an apparatus and method for searching for 3-dimensional shapes, which automatically search for the 3-dimensional shapes of objects without information input by a user.

A further object of the present invention is to provide an apparatus and method for searching for 3-dimensional shapes, which allow 2-dimensional image data, including all the shape features of objects having 3-dimensional shapes, to be stored and used for searching for the 3-dimensional shapes of identical or similar objects.

Yet another object of the present invention is to provide an apparatus and method for searching for 3-dimensional shapes, which provide a reference that allow consistency to be maintained when 3-dimensional shapes are converted into 2-dimensional image data.

Still another object of the present invention is to provide an apparatus and method for searching for 3-dimensional shapes that accurately search for 3-dimensional shapes, which have already been stored, using the features of the 3-dimensional shapes of objects.

In order to accomplish the above objects, the present invention provides an apparatus for searching for 3-dimensional shapes, the apparatus including an input means for receiving 3-dimensional image data about the shape of an object targeted for shape search; an acquisition module for acquiring a 2-dimensional image data group about the shape of the object represented by the 3-dimensional image data; a storage means for previously storing 3-dimensional image data about the shapes of a plurality of objects, and 2-dimensional image data groups about the shapes of the plurality of objects represented by the 3-dimensional image data; a comparison and search module for searching for 3-dimensional image data corresponding to a previously stored 2-dimensional image data group that is similar to the acquired 2-dimensional image data within a predetermined range, by comparing the respective data of the 2-dimensional image data group, which are acquired by the acquisition module, with the respective data of the 2-dimensional image data groups, which are previously stored in the storage means; an output means for displaying the 3-dimensional image data found by the comparison and search module to an outside; and a control means for controlling the input means, the acquisition module, the storage means, the comparison and search module, and the output means.

In addition, in order to accomplish the above objects, the present invention provides a method of searching for 3-dimensional shapes, the method including the steps of: receiving 3-dimensional image data about the shape of an object targeted for shape search; acquiring a 2-dimensional image data group about the shape of the object represented by the 3-dimensional image data; comparing the respective data of the 2-dimensional image data group, which are acquired by the acquisition module, with the respective data of the 2-dimensional image data groups, which are previously stored in a predetermined database; searching for previously stored 2-dimensional image data group that is similar to the acquired 2-dimensional image data group within a predetermined range based on comparison; and providing 3-dimensional image data that have been previously stored in the predetermined database and correspond to the searched 2-dimensional image data group.

In addition, in order to accomplish the above objects, the present invention provides an apparatus for searching for 3-dimensional shapes, the apparatus including an input means for receiving a 2-dimensional image data group about the shape of an object targeted for shape search; a storage means for previously storing 3-dimensional image data about the shapes of a plurality of objects, and 2-dimensional image data groups about the shapes of the plurality of objects represented by the 3-dimensional image data; a comparison and search module for searching for 3-dimensional image data corresponding to a previously stored 2-dimensional image data group, which is similar to the received 2-dimensional image data within a predetermined range, by comparing the respective data of the received 2-dimensional image data group with the respective data of the 2-dimensional image data groups, which are previously stored in the storage means; an output means for displaying the 3-dimensional image data found by the comparison and search module to an outside; and a control means for controlling the input means, the storage means, the comparison and search module, and the output means.

In addition, in order to accomplish the above objects, the present invention provides a method of searching for 3-dimensional shapes, the method including the steps of: receiving 3-dimensional image data about the shape of an object targeted for shape search; comparing the respective data of the 2-dimensional image data group with the respective data of the 2-dimensional image data groups that are previously stored in a predetermined database; searching for previously stored 2-dimensional image data that is similar to the acquired 2-dimensional image data within a predetermined range based on comparison; and providing 3-dimensional image data that have been previously stored in the predetermined database and corresponds to the found 2-dimensional image data group.

In addition, in order to accomplish the above objects, the present invention provides an apparatus for establishing a database for 3-dimensional shape search, the apparatus including an input means for receiving 3-dimensional image data about the shape of an object targeted for shape search; an acquisition module for acquiring a 2-dimensional image data group about the shape of the object represented by the 3-dimensional image data; a storage means for storing the 3-dimensional image data, along with the 2-dimensional image data group corresponding to the 3-dimensional image data; and a control means for controlling the input means, the acquisition module, and the storage means.

The 3-dimensional image data is graphic data, and the apparatus further includes a photographing means for generating point data by scanning the object, converting the point data into graphic data, and transferring the converted point data to the input means.

In addition, in order to accomplish the above objects, the present invention provides a method of establishing a database for 3-dimensional shape search, the method including the steps of: receiving 3-dimensional image data about the shape of an object targeted for shape search; acquiring a 2-dimensional image data group about the shape of the object represented by the 3-dimensional image data; and storing the 3-dimensional image data, along with the 2-dimensional image data group corresponding to the 3-dimensional image data.

The 3-dimensional image data is graphic data, and the receiving step includes the photographing step of generating point data by scanning the object, converting the point data into graphic data, and transferring the graphic data.

The acquisition module for the apparatus for searching for 3-dimensional shapes or the method of establishing a database for 3-dimensional shape search is provided as follows.

The acquisition module divides the shape on a basis of a predetermined reference plane, and acquires a 2-dimensional image data group about sections of the divided shape.

It is preferred that the acquisition module fill the inner portions of the sections of the divided shape with indication of a section, and acquire the 2-dimensional image data group, including a plurality of pieces of 2-dimensional image data about the filled sections.

Furthermore, the acquisition module acquires a 2-dimensional image data group, including planar shapes viewed at one or more points.

It is preferred that the acquisition module determine a direction of a longest dimension of the shape to be a first axis, a direction perpendicular to the first axis to be a second axis, and a direction perpendicular to the first and second axes to be a third axis, and acquire a 2-dimensional image data group including planar shapes depending on points at which the object is viewed from the first to third axes.

Furthermore, the acquisition module acquires a 2-dimensional image data group additionally including planar shapes that are acquired when the shape is viewed from a plurality of points that form predetermined angles with the first to third axes.

In addition, the acquisition step for the apparatus for searching for 3-dimensional shapes or the method of establishing a database for 3-dimensional shape search is provided as follows.

The acquisition step includes the step of: dividing the shape on a basis of a predetermined reference plane; and acquiring a 2-dimensional image data group about the sections of the divided shape.

It is preferred that the acquisition step includes the steps of: filling the inner portions of the sections of the divided shape with indication of a section; and acquiring the 2-dimensional image data group including a plurality of pieces of 2-dimensional image data about the filled sections.

Furthermore, the acquisition step acquires the 2-dimensional image data group including planar shapes viewed at one or more points.

It is preferred that the acquisition step determine the direction of the longest dimension of the shape to be a first axis, a direction perpendicular to the first axis to be a second axis, and a direction perpendicular to the first and second axes to be a third axis, and acquire a 2-dimensional image data group including planar shapes depending on points at which the object is viewed from the first to third axes.

Furthermore, the acquisition step acquires a 2-dimensional image data group additionally including planar shapes that are acquired when the shape is viewed from a plurality of points that form predetermined angles with the first to third axes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention are described in detail with reference to the accompanying drawings below.

Figure 1:
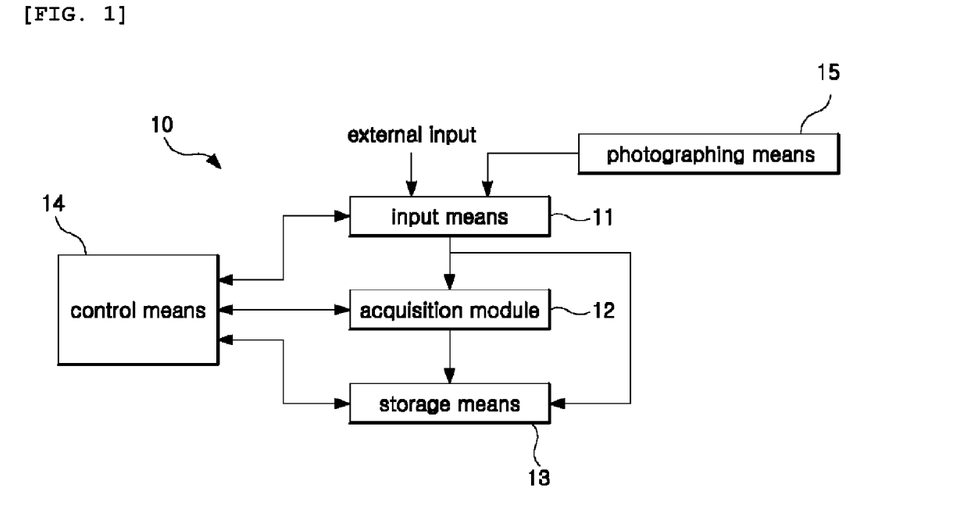
FIG. 1 is a block diagram showing the construction of a database establishment device for 3-dimensional shape search according to the present invention.

FIG. 1 is a block diagram showing the construction of a database establishment device for 3-dimensional shape search according to the present invention.

As shown in FIG. 1, the database establishment device 10 includes an input means 11 for receiving 3-dimensional image data about the shape of an object targeted for shape search, an acquisition module 12 for acquiring a 2-dimensional image data group including the shapes of the object represented by the 3-dimensional image data, a storage means 13 for storing the 3-dimensional image data, along with the 2-dimensional image data group corresponding to the 3-dimensional image data, and a control means 14 for controlling the input means 11, the acquisition module 12, and the storage means 13.

Specifically, the input means 11 may be a drive that reads 3-dimensional image data from an external input medium (for example, a Compact Disk (CD), a Digital Video Disk (DVD), other storage media, or a photographing means 15, such as a scanning device, that will be described later), or a general input interface. Furthermore, the input means 11 may be a network interface that can connect to a specific network, for example, the Internet or a Local Area Network (LAN).

Meanwhile, the 3-dimensional image data that represents the input shape of an object refer to graphic data generated by, for example, a Computer Aided Design (CAD)/Computer Aided Manufacturing (CAM) system or some other graphic tool.

The acquisition module 12 can acquire a 2-dimensional image data group including the shapes of the object, which is represented by the 3-dimensional image data, according to a first and/or second method that are described below.

In the first method, the acquisition module 12 divides the shape of an object, which is represented by the 3-dimensional image data, on the basis of a predetermined reference plane, and acquires the 2-dimensional image data group including the sections of the divided shape. That is, the acquisition module 12 divides the shape of the object, which is represented by the input 3-dimensional image data, on the basis of a predetermined reference plane (for example, the perpendicular plane of the object or a plane for which the contact area of the object is maximized). In this case, the divided sections of the shape of the object, which is represented by 3-dimensional image data, are represented by only the outer and inner circumferences of the shape of the object, and a portion between the inner and outer circumference of the object is represented as a vacant space, like the outside of the object. To indicate that the vacant space is the inside of the object, the acquisition module 12 fills the inner portions of the sections of the divided shape with indication of a section, and acquires the 2-dimensional image data group including a plurality of pieces of 2-dimensional image data including the filled sections. A method of filling the inner portion employs conventional technology for determining the sections of the shape of an object. The acquisition module 12 may be a separate hardware device, or a software program stored in the storage means 13.

In this case, the plurality of pieces of acquired 2-dimensional image data are image data for indicating the sections of the shape of the object, for example, Bit Map (BMP) files.

When the shape of an object is divided, a plane that better represents the features of the shape of the object is determined to be the reference plane. Furthermore, to prevent a reference plane from varying with users' points of view, when the users determine reference planes for different objects, the reference planes must be determined such that the reference can be easily determined. The supporting plane of the object, or the plane for which the contact area of the object is maximized, which is described above, is used as a reference plane, the shape of the object can be divided by the plurality of users on the basis of an identical or similar reference plane. Furthermore, it is preferred that the shape of the object be divided in the same direction and/or at the intervals on the basis of the reference plane, so that the consistency of the 2-dimensional image data group generated based on the 3-dimensional image data can be further guaranteed. However, 2-dimensional image based on a plurality of reference planes that is determined by the user may be stored in the case where the storage means 13 having a sufficient capacity to store 2-dimensional image data including the divided sections is provided. Such a storage means 13 is not appropriate in the point of view of cost or efficiency, but is applicable.

In the second method, the acquisition module 12 acquires a 2-dimensional image data group including planar shapes viewed at one or more points for a shape represented by 3-dimensional image data shape. That is, the acquisition module 12, for example, determines the direction of the longest dimension of the shape to be a first axis, a direction perpendicular to the first axis to be a second axis, and a direction perpendicular to the first and second axes to be a third axis, and acquires the 2-dimensional image data group including planar shapes depending on points at which the object is viewed from the first to third axes. Furthermore, the acquisition module 12 can acquire a 2-dimensional image data group additionally including planar shapes that are acquired when the shape is viewed from a plurality of points that form predetermined angles with the first to third axes. The points at which the object is viewed may be defined and used by various methods.

The 2-dimensional image data group including the planar shapes is, for example, image data, such as a BMP file, that represents the shape of an object.

Furthermore, the control means 14 may additionally perform a process of determining whether input data, which are received through the input means 11, are 3-dimensional image data. Based on the determination, the 3-dimensional image data is transferred to the acquisition module 12, and the 2-dimensional image data group generated by the acquisition module 12 is stored in the storage means 13, along with the 3-dimensional image data corresponding to the 2-dimensional image data group. In this case, the stored 2-dimensional image data group includes the sections of the divided shape based on the first method and/or the planar shapes based on the second method.

Furthermore, the control means 14 may receive predetermined information about the 3-dimensional image data (for example, the molding scheme of an object) from the input means 11 and store it, along with the 3-dimensional image data, in the storage means 13.

The 3-dimensional image data is stored while corresponding to the 2-dimensional image data group based on the first or second methods.

Furthermore, the establishment device 10 may further include the photographing means 15 that generates point data by scanning the object, converts the point data into graphic data (that is, 3-dimensional image data), and transfers the converted data to the input means 11. The photographing means 15 may be mounted in the establishment device 10, or the 3-dimensional image data is transferred to the input means 11 from the outside in external input form. In particular, the photographing means 15 is a device that can photograph the internal shape of an object as well as the external shape thereof (in the case where a vacant space exists inside the object.

FIGS. 2A to 2E are flowcharts illustrating a method of establishing a database for 3-dimensional shape search according to the present invention.

Figure 2A:
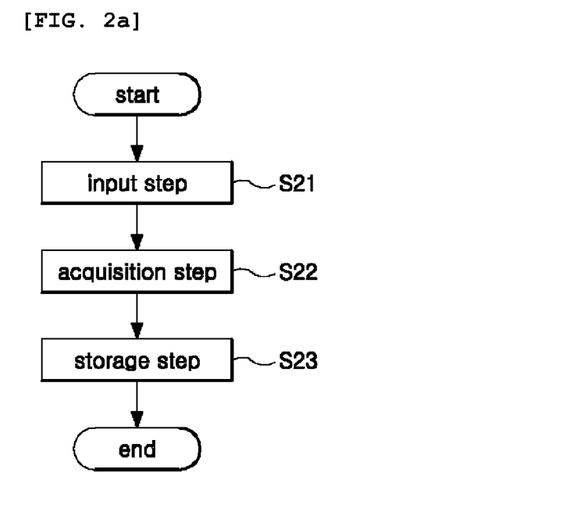
FIGS. 2A to 2E are flowcharts illustrating a method of establishing a database for 3-dimensional shape search according to the present invention.

As shown in FIG. 2A, the method includes step S21 of receiving 3-dimensional image data, step S22 of acquiring a 2-dimensional image data group from the shapes of the object represented by the 3-dimensional image data, and step S23 of storing the 2-dimensional image data group, along with the 3-dimensional image data corresponding to the 2-dimensional image data group.

Specifically, at input step S21, the input means 11 receives external input or the 3-dimensional image data about the shape of the object from the connected photographing means 15.

At acquisition step S22, the control means 14 transfers the 3-dimensional image data to the acquisition module 12, acquires the 2-dimensional image data group composed of pieces of 2-dimensional image data from the shape of the object represented by the 3-dimensional image data, based on a predetermined rule (for example, the first or second method described above), and transfers the acquired data group to the control means 14.

At storage step S23, the control means 14 stores the 2-dimensional image data group, along with the 3-dimensional image data corresponding to the 2-dimensional image data group, in the storage means 13. In this case, the control means 14 may receive predetermined information about the 3-dimensional image data (for example, the molding scheme of an object) from the input means 11 and store it, along with the 3-dimensional image data, in the storage means 13.

Figure 2B:
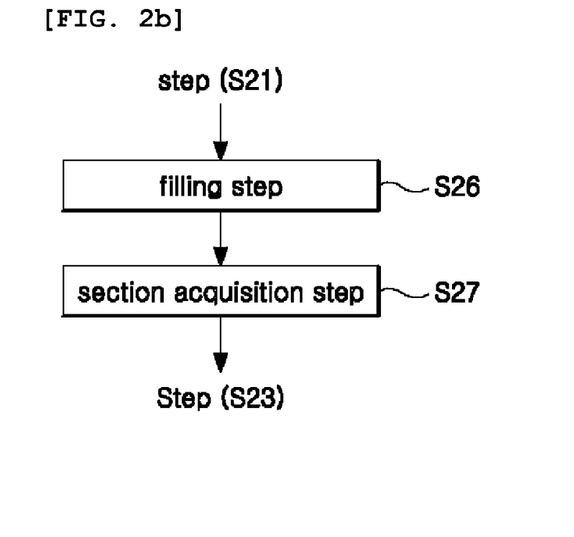

FIG. 2B is a detailed flowchart according to the first method of acquisition step S22. That is, acquisition step S22 includes step S26 of dividing the shape of the object represented by the input 3-dimensional image data and filling the inner portions of the sections of the divided shape with indication of a section, and step S27 of acquiring image data, that is, the 2-dimensional image data including the filled sections.

Figure 2C:
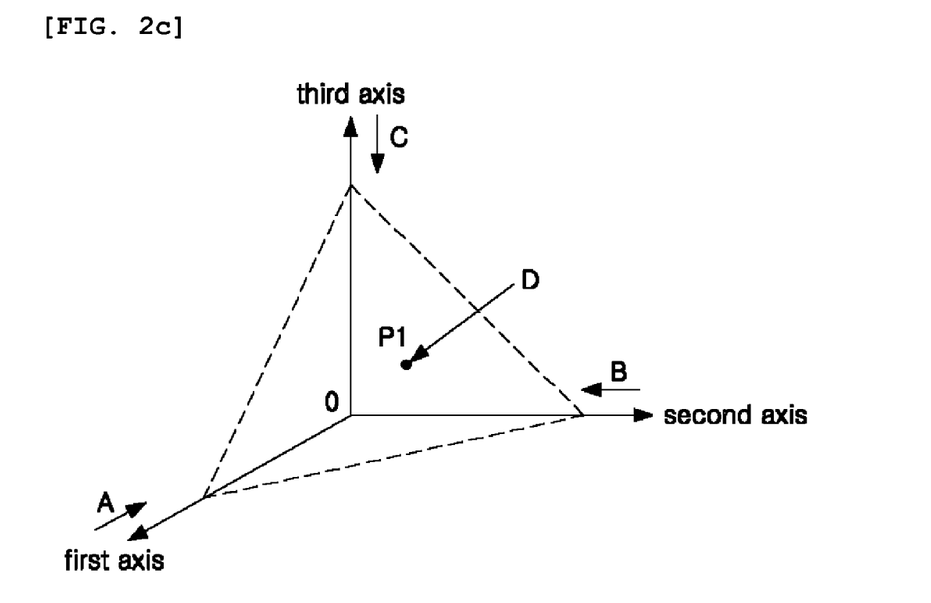

FIG. 2C is a conceptual flowchart according to the second method of acquisition step S22.

At acquisition step S22, the acquisition module 12 determines the direction of the longest dimension of the shape to be a first axis, a direction perpendicular to the first axis to be a second axis, and a direction perpendicular to the first and second axes to be a third axis (in the present embodiment, only the one of 8 divided spaces divided is shown). In this case, it is preferred that the intersecting point 0 of the first to third axes be located at the center of the shape (or the center of gravity), but may be placed at another location. Accordingly, the acquisition module 12 acquires the 2-dimensional image data group including the planar shapes of an object viewed from points A, B and C.

Furthermore, the acquisition module 12 can additionally acquires a planar shape depending on a point D viewed from a point P1 forming the same angle (45° in the present embodiment) with the first to third axes (the other points P2 to P8 are not shown in the present embodiment). That is, the acquisition module 12 additionally acquires 8 planar shapes viewed from the points P2 to P8, so that the 2-dimensional image data group, including a total of 11 planar shapes, can be acquired.

Figure 2D:
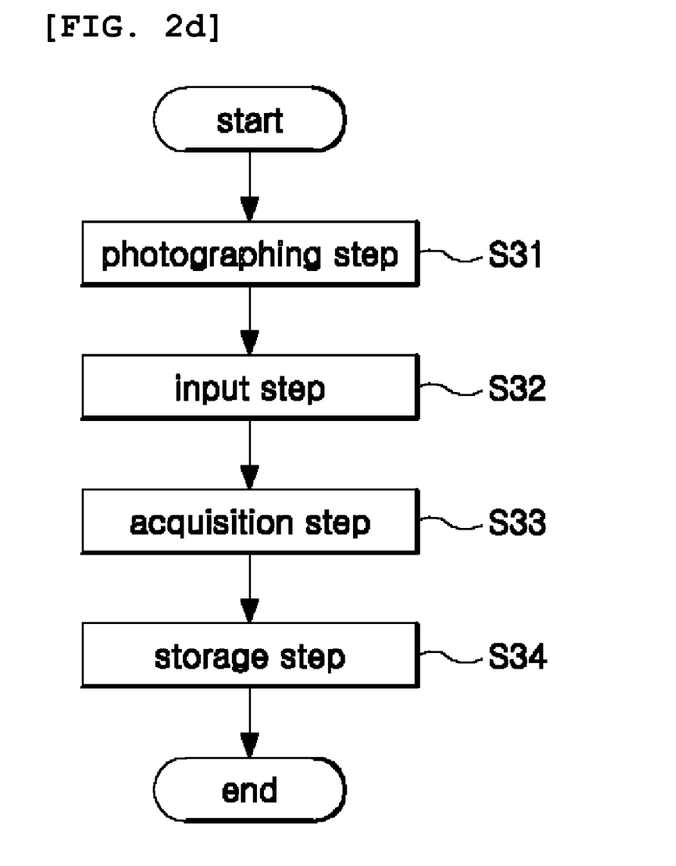
Figure 2E:
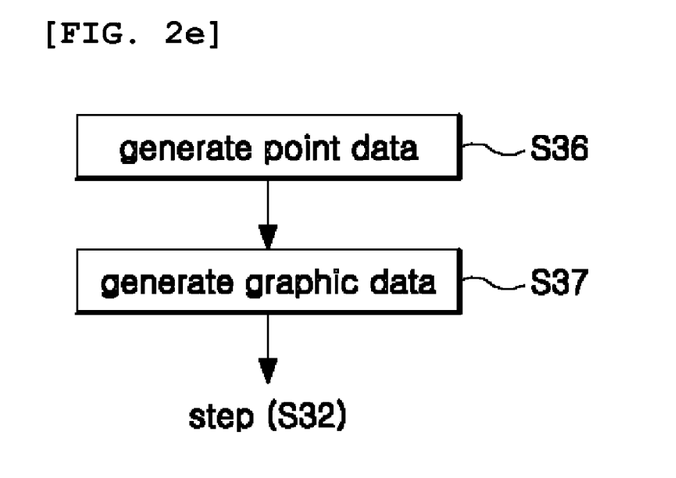

FIG. 2D is a flowchart illustrating a method of establishing a database for searching for a 3-dimensional shape according to another embodiment of the present invention, and FIG. 2e is a detailed flowchart of step S31.

As shown in FIG. 2D, the method includes steps S32, S33 and S34 identical to steps S21, S22 and S23 disclosed in the method of FIG. 2A, and further includes photographing step S31 of generating 3-dimensional image data about the shape of an object.

As shown in FIG. 2E, photographing step S31 includes step S37 of generating point data about the shape of an object using the photographing means 15 and step S38 of generating graphic data (3-dimensional image data) through the connection of the point data to each other.

The above-described flowcharts of FIGS. 2A to 2E may be prepared using a predetermined software program and stored in a predetermined storage medium. When the storage medium is inserted into an operational device, such as a computer, so that the method of establishing a database for 3-dimensional shape search according to the present invention may be performed.

Figure 3A:
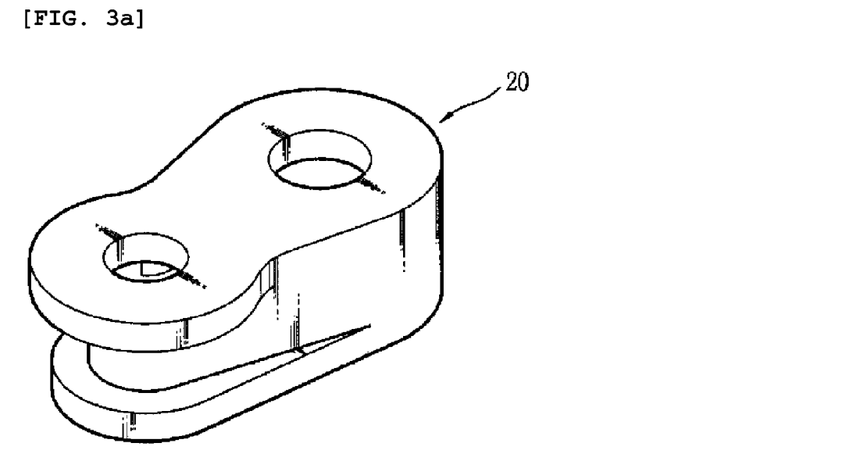
FIGS. 3A to 3C show an embodiment illustrating the data processing process of the database establishment device of FIG. 1.
Figure 3B:
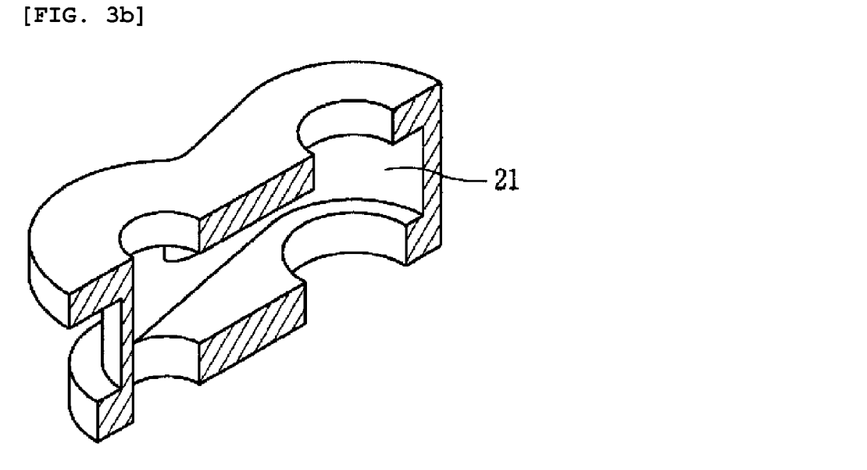
Figure 3C:
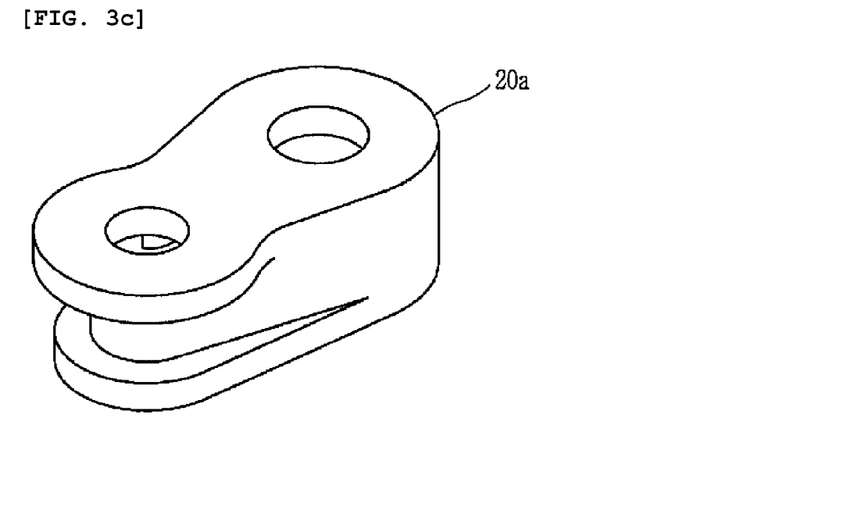

FIGS. 3A to 3C show an embodiment of the data processing process of the database establishment device of FIG. 1.

FIG. 3A illustrates the shape of an actual object 20.

FIG. 3B illustrates the longitudinal section of the FIG. 3A, and shows the object, the inner portion 21 of which is vacant.

FIG. 3C illustrates the shape 20a of an object that is represented by 3-dimensional image data generated when the object of FIG. 3A is photographed using the photographing means 15.

Figure 4A:
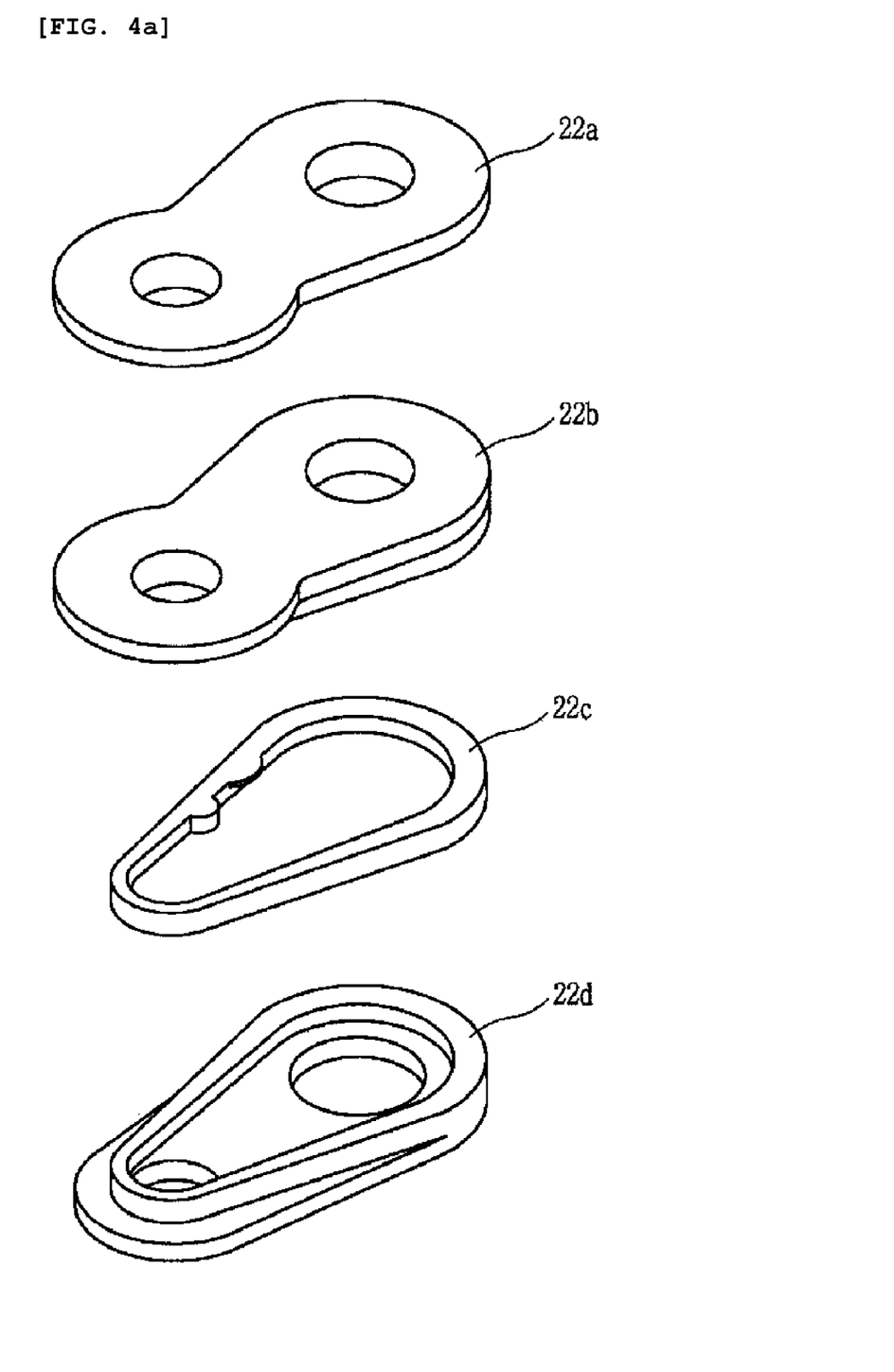
FIGS. 4A to 4C show an embodiment of a 2-dimensional image data group according to a first method.
Figure 4B:
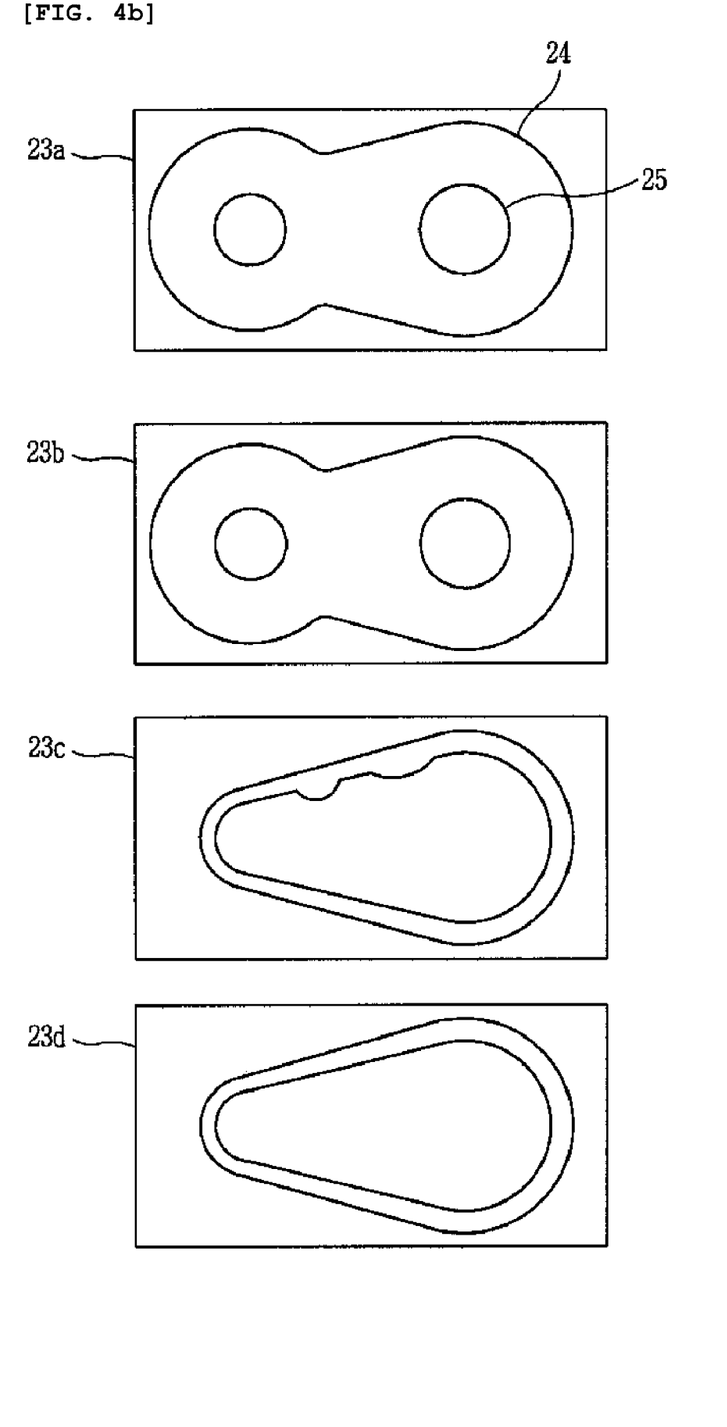
Figure 4C:
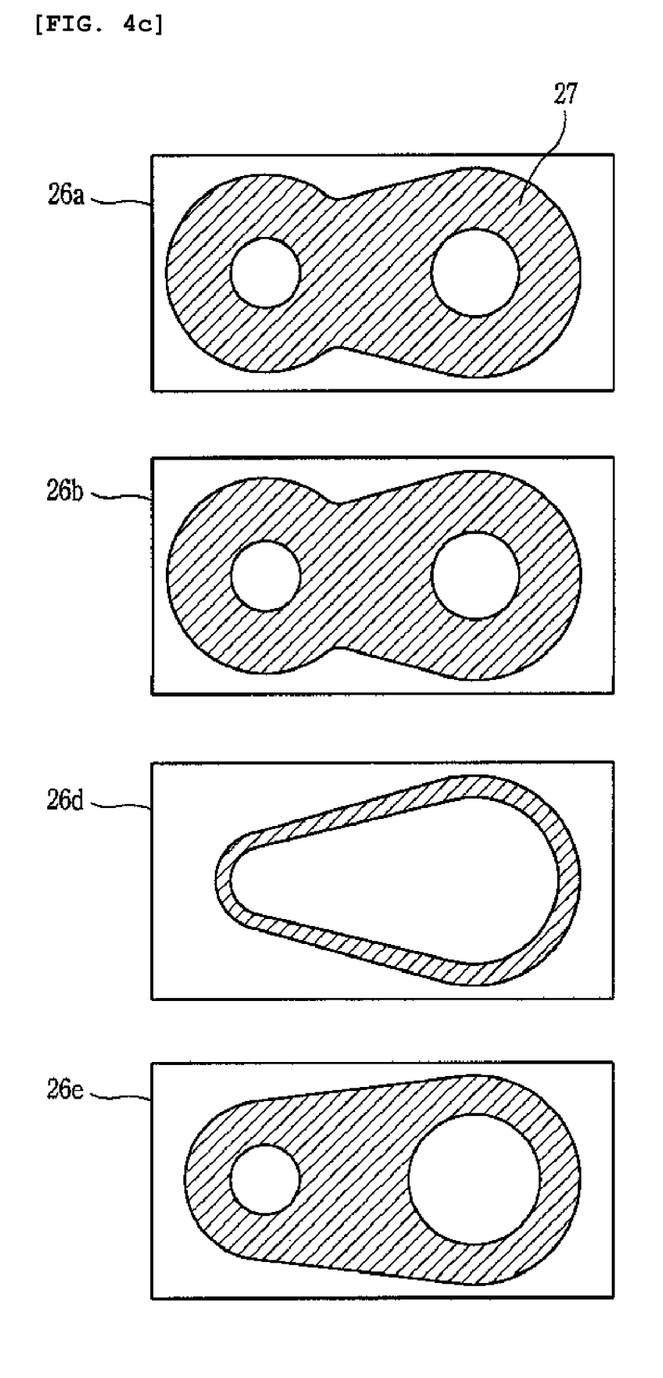

FIGS. 4A to 4C show an embodiment of a 2-dimensional image data group according to the first method.

FIG. 4A illustrates the portions 22a to 22e of the object, which is represented by the 3-dimensional image data and the shape 20a of which is divided by the acquisition module 12.

FIG. 4B illustrates sections acquired from the divided object in FIG. 4A. The sections 23a to 23e are separated from each other but are processed in a bundle. A line 24 indicates the outer circumference of the object 20, and a line 25 indicates the inner circumference of the object 20. The acquisition module 12 represents the interior between the line 24 of the outer circumference and the line 25 of the outer circumference as sections.

FIG. 4C illustrates a 2-dimensional image data group generated by filling the inner portions of sections of FIG. 4B with indication of a section. The sections 26a to 26e are filled with the indication of a section 27, so that the feature of 3-dimensional image data can be contained therein.

Figure 5A:
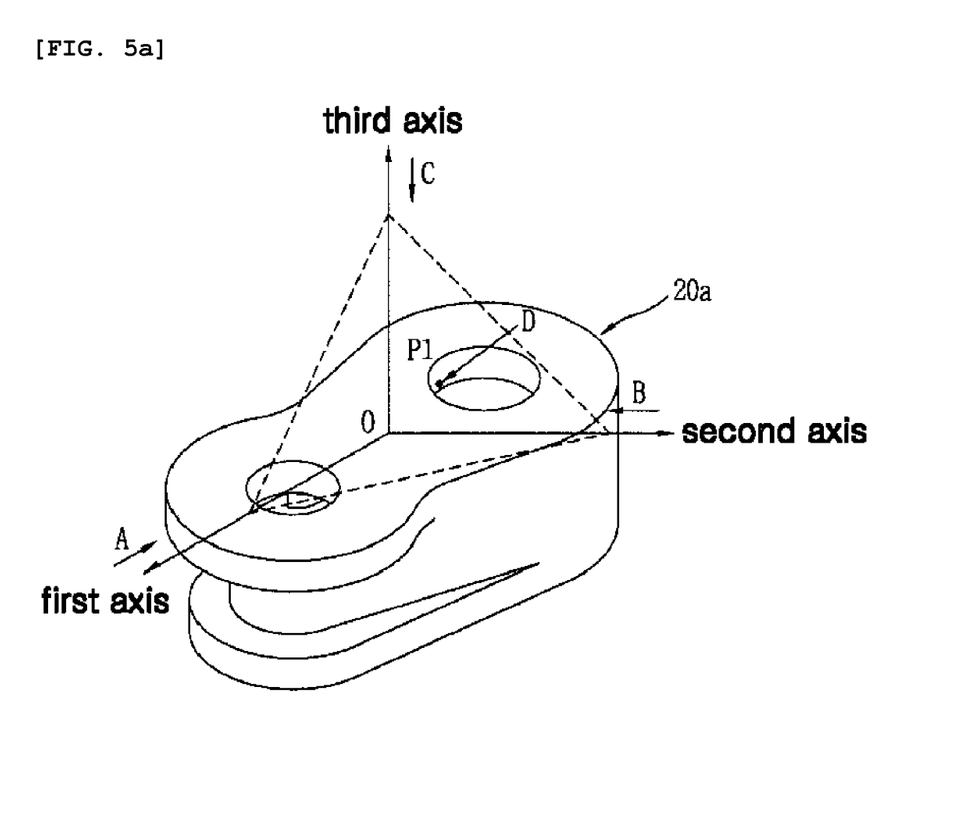
FIGS. 5A and 5B show an embodiment of a 2-dimensional image data group according to the second method.
Figure 5B:
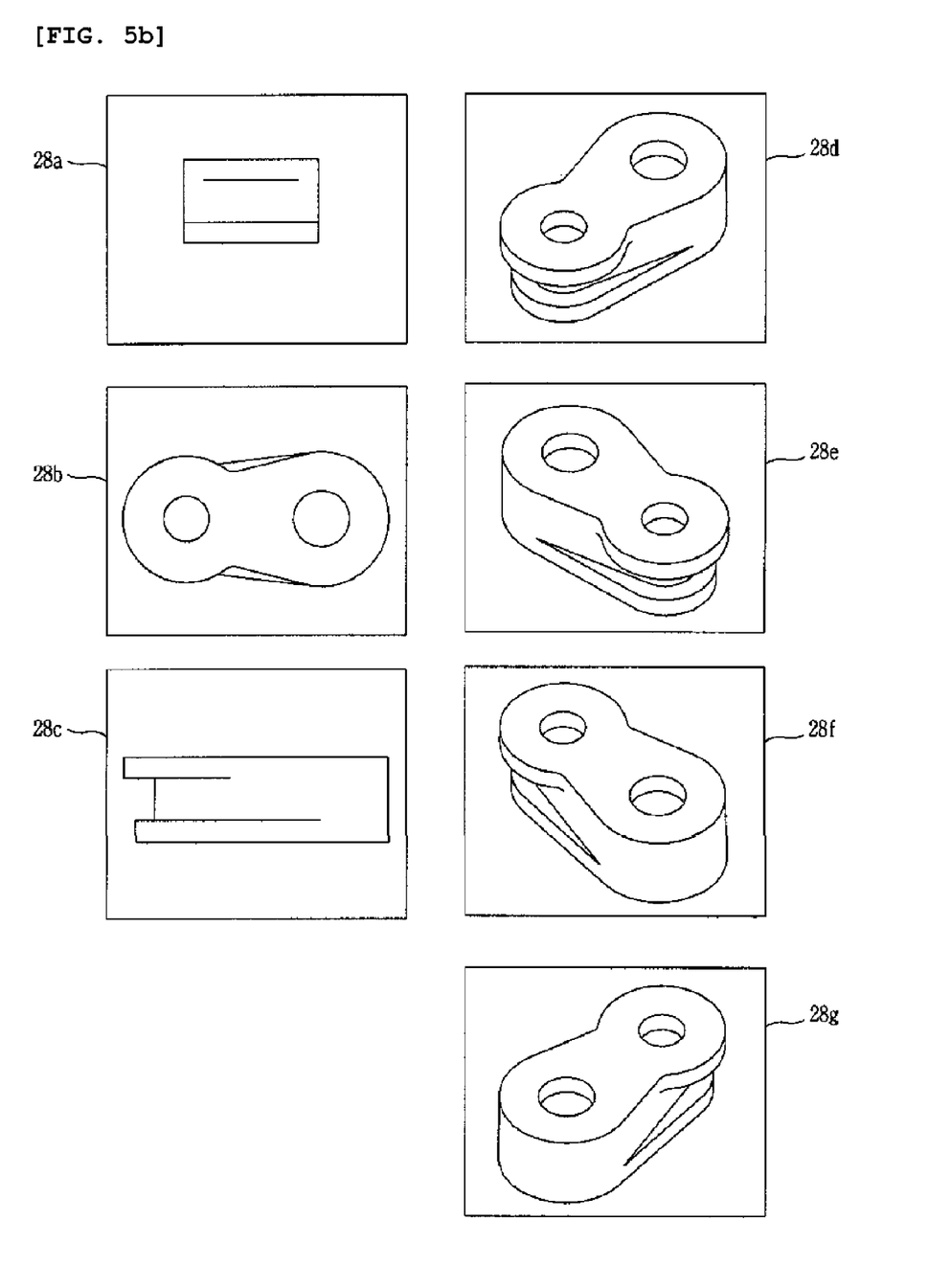

FIGS. 5A and 5B are an embodiment of a 2-dimensional image data group according to the second method.

As shown in FIG. 5A, with respect to the shape 20a of the object represented by 3-dimensional image data, the direction of the longest dimension of the shape is determined to be a first axis, a direction perpendicular to the first axis is determined to be a second axis, and a direction perpendicular to the first and second axes is determined to be a third axis (only the one of 8 divided spaces is shown in the present embodiment). A planar shape depending on a point D viewed from a point P1 forming the same angle (45° in the present embodiment) with the first to third axes (the other points P2 to P8 are not shown in the present embodiment) may be additionally acquired. That is, 8 planar shapes viewed from the points P2 to P8 are additionally acquired, so that the 2-dimensional image data group, including a total of 11 planar shapes, is acquired.

FIG. 5B is an embodiment of the planar shapes acquired in FIG. 5A.

As shown in FIG. 5B, acquired 2-dimensional image data group, including planar shapes viewed from a plurality of points. Planar shapes 28a, 28b and 28c are shapes viewed from first to third axes, respectively, and planar shapes 28d to 28g are the portions (portion having third positive (+) axes) of shapes viewed from points at angles identical to those formed with the first to third axes. The other planar shapes (portions having third negative (−) axes) are also acquired, as in the planar shapes 28d to 28g.

Figure 6:
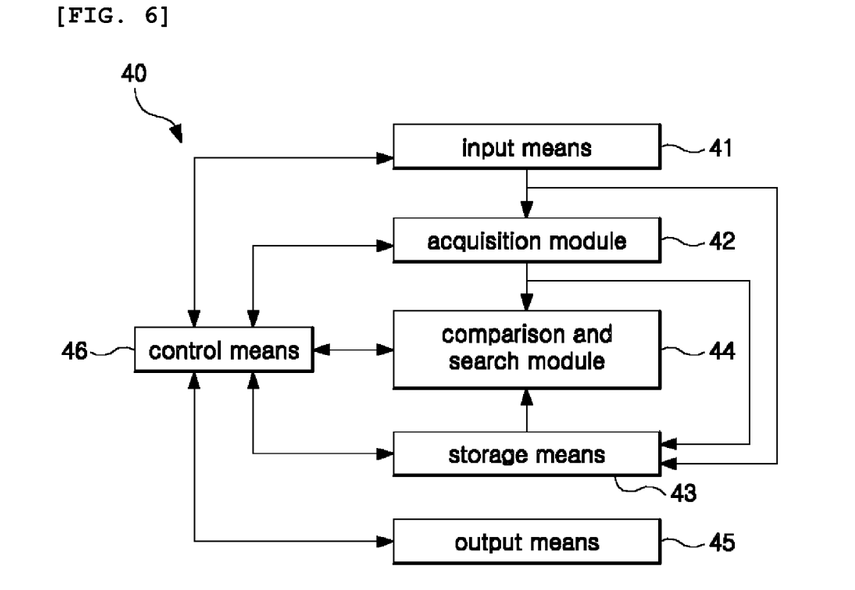
FIG. 6 is a block diagram showing the construction of an apparatus for searching for 3-dimensional shapes according to the present invention.

FIG. 6 is a block diagram showing the construction of an apparatus for searching for 3-dimensional shapes according to the present invention. As shown in FIG. 6, the apparatus 40 for searching for 3-dimensional shapes includes an input means 41 for receiving 3-dimensional image data about the shape of an object targeted for shape search, an acquisition module 42 for acquiring a 2-dimensional image data group about the shape of the object represented by the 3-dimensional image data, a storage means 43 for previously storing 3-dimensional image data about the shapes of a plurality of pieces of objects and 2-dimensional image data groups corresponding to the 3-dimensional image data, a comparison and search module 44 for searching for 3-dimensional image data corresponding to a previously stored 2-dimensional image data group that is similar to the acquired 2-dimensional image data within a predetermined range, by comparing respective data of the 2-dimensional image data group, which are acquired by the acquisition module, with respective data of the 2-dimensional image data groups, which are previously stored in the storage means 43, an output means 45 for displaying the 3-dimensional image data found by the comparison and search module 44 to the outside, and a control means 46 for controlling the input means 41, the acquisition module 42, the storage means 43, the comparison and search module 44, and the and the output means 45.

Specifically, the input means 41, acquisition module 42 and storage means 43 of FIG. 6 are the same components as the input means 11, acquisition module 12 and storage means 13 of FIG. 1.

Meanwhile, the comparison and search module 44 performs a process of comparing the respective data of the acquired 2-dimensional image data group with the respective data of the 2-dimensional image data groups that stored in the storage means 43, and a process of searching for 3-dimensional image data corresponding to a previously stored 2-dimensional image data group that is similar to the acquired 2-dimensional image data within a predetermined range.

The comparison process is performed by a content-based image searching method that was previously developed, and can search for an image having a similar shape regardless of the location, size and rotational angle of image data using the similarity coefficient of an object shape contained in the image. That is, the comparison and search module 44 compares the respective data of the acquired 2-dimensional image data group with the respective data of the plurality of 2-dimensional image data groups stored in the storage means 43, and searches for a 2-dimensional image data group, including data within the predetermined range of similarity (for example, within a similarity of more than 70%). In this case, the comparison and search module 44 compares the 2-dimensional image data group, including the sections based on the first method, and/or the 2-dimensional image data group, including the sections based on the second method. For example, the comparison and search module 44 acquires the 2-dimensional image data group, compares it with the stored 2-dimensional image data groups (in this case, a searched group is also a data group acquired by the second method), and finds the 2-dimensional image data group, including data within the predetermined range of similarity. In this case, when a plurality of 2-dimensional image data groups are found, the comparison and search module 44 acquires the 2-dimensional image data group based on the first method again, compares the acquired data with the stored 2-dimensional image data groups (in this case, a searched group is also a data group acquired by the first method), so that the most similar one of the plurality of previously searched 2-dimensional image data groups can be found. Accordingly, the comparison and search module 44 acquires the 2-dimensional image data group based on the first method and/or the 2-dimensional image data group based on the second method in sequence or independently, so that similar 2-dimensional image data that have been previously stored can be searched for.

Thereafter, the comparison and search module 44 searches for 3-dimensional image data corresponding to the similar 2-dimensional image data, which have been previously stored and searched at comparison step, from the storage means 43, and transfers 3-dimensional image data to the control means 46. Furthermore, the comparison and search module 44 may read predetermined information about the corresponding 3-dimensional image data (for example, the molding scheme of an object) from the storage means 43 and transfer the corresponding 3-dimensional image data, along with the predetermined information, to the control means 46. In this case, the comparison and search module 44 may be a separate hardware device, or a software program in the storage means 43.

Furthermore, the control means 46 may additionally perform a process of determining whether input data, which are received through the input means 41, are 3-dimensional image data. Based on the determination, the 3-dimensional image data is transferred to the acquisition module 42, and the 2-dimensional image data group generated by the acquisition module 42 is transferred to the comparison and search module 44. Furthermore, the control means 46 may cause the input 3-dimensional image data to be stored in the storage means 43, along with the 2-dimensional image data group corresponding to the input 3-dimensional image data.

In this case, the output means 45 may be a means for displaying information to a user, a drive for outputting and storing predetermined data, or a network interface connectable to a specific network, for example, the Internet or a LAN.

Figure 7:
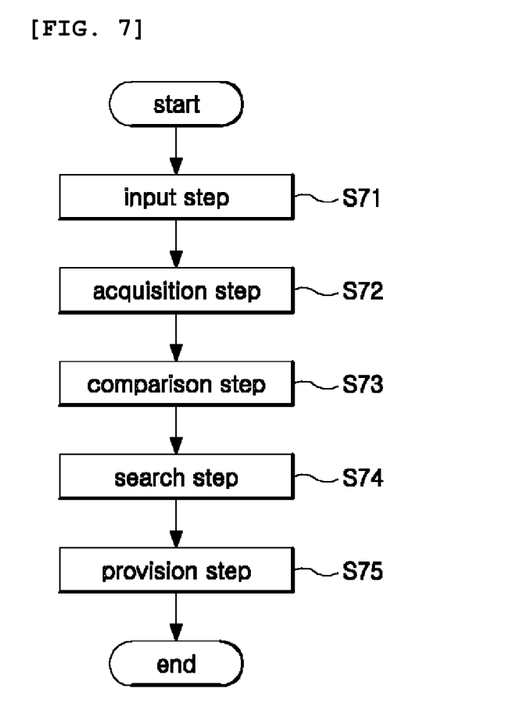
FIG. 7 is a flowchart illustrating a method of searching for 3-dimensional shapes according to a first embodiment of the present invention.

FIG. 7 is a flowchart illustrating a method of searching for 3-dimensional shapes according to a first embodiment of the present invention. As shown in FIG. 7, the method includes step S71 of receiving 3-dimensional image data, step S72 of acquiring a 2-dimensional image data group including the shapes of the object represented by the 3-dimensional image data, step S73 of comparing acquired 2-dimensional image data and previously stored 2-dimensional image data, step S74 of searching for 3-dimensional image data based on the result of the comparison, and step S75 of providing the found 3-dimensional image data.

Specifically, the steps S71 and S72 of FIG. 7 are the same as the steps S21 and S22 of FIG. 2A, respectively.

The comparison and search module 44 compares the respective data of the 2-dimensional image data group, which is acquired at step S73, with the respective data of the 2-dimensional image data groups, which are stored in the storage means 43, based on a predetermined content-based image searching method, searches for 3-dimensional image data corresponding to the 2-dimensional image data group within the predetermined range of similarity at step S74, and transfers the 3-dimensional image data to the control means 46. Furthermore, the comparison and search module 44 may read predetermined information about the corresponding 3-dimensional image data (for example, the molding scheme of an object) from the storage means 43 and transfer the corresponding 3-dimensional image data, along with the predetermined information, to the control means 46.

At step S75, the control means 46 transfers the searched 3-dimensional image data to output means 45.

Figure 8:
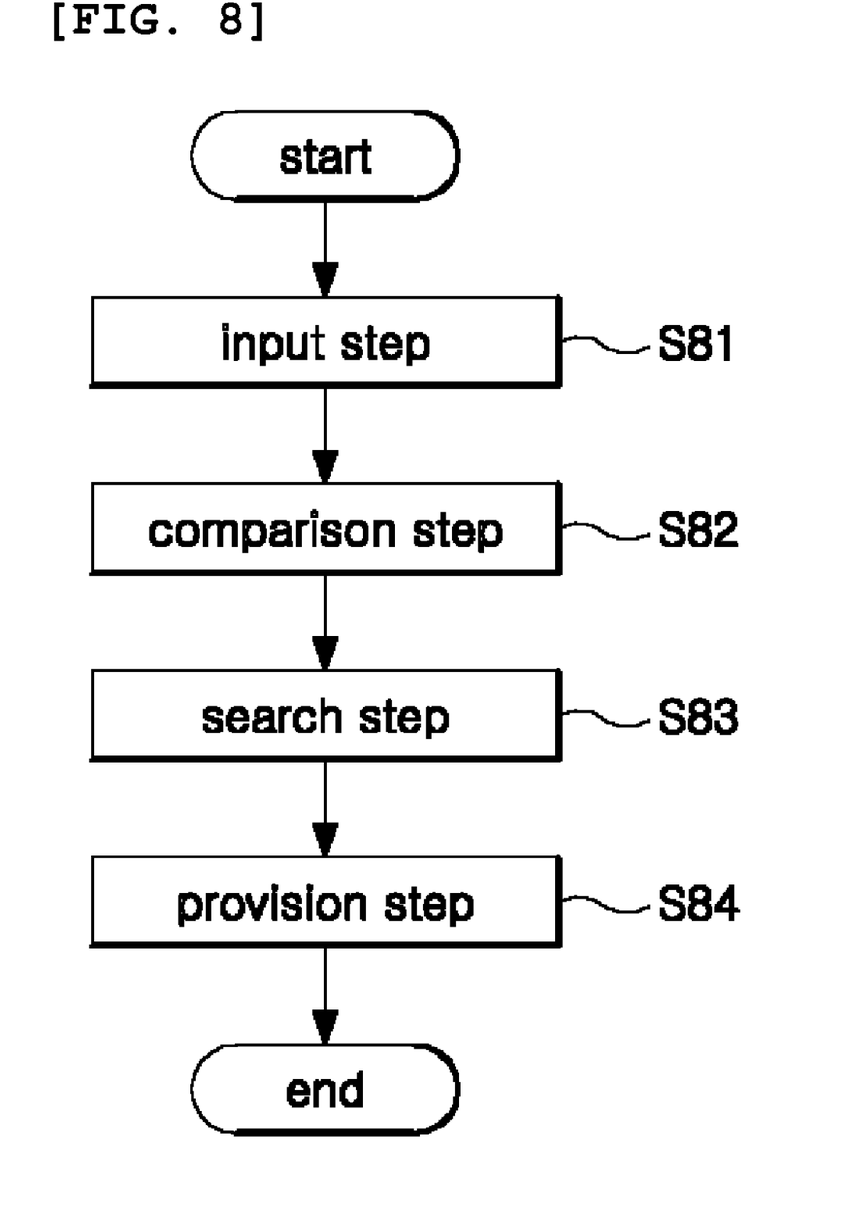
FIG. 8 is a flowchart illustrating a method of searching for 3-dimensional shapes according to a second embodiment of the present invention.

FIG. 8 is a flowchart illustrating a method of searching for 3-dimensional shapes according to a second embodiment of the present invention. In this embodiment, when the 2-dimensional image data group, instead of the 3-dimensional image data, is input at input step S81, the control means 46 determines whether the input data is 3-dimensional image data as described above. In the case where the 2-dimensional image data group is input, the step S72 of FIG. 7 is not necessary.

Specifically, at step S81, the input means 41 receives the 2-dimensional image data group about the shape of the object and transfers the received data to the control means 46.

At step S82, the control means 46 transfers the input 2-dimensional image data group to the comparison and search module 44 and causes the step identical to the step S73 of FIG. 7 to be performed.

Steps S83 and S84 are the same as the steps S74 and S75 of FIG. 7, respectively.

The above-described flowcharts of FIGS. 7 and 8 may be prepared using a predetermined software program and stored in a storage medium. The storage medium may be inserted into an operational device, such as a computer, so that the method of establishing a database for 3-dimensional shape search according to the present invention may be performed.

As described above, the present invention can accurately and quickly search for objects having 3-dimensional shapes.

Furthermore, the present invention allows the search for input 3-dimensional image data to be automatically performed.

Furthermore, the present invention stores 2-dimensional image data, including all the shape features of an object having a 3-dimensional shape, thus allowing the stored data to be used to search for an identical or similar object.

Furthermore, the present invention can provide an effective reference that allows consistency to be maintained at the time of the conversion of a 3-dimensional shape into a 2-dimensional shape.

Furthermore, the present invention can accurately search for already stored 3-dimensional shapes using the features of the 3-dimensional shapes of objects.

Furthermore, the present invention can provide identical or similar 3-dimensional image data by comparing and searching for 2-dimensional image data and 3-dimensional image data input off-line or on-line.

Furthermore, the present invention can provide 3-dimensional image data, along with predetermined information related to the 3-dimensional image data (for example, the molding scheme of an object).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for searching for 3-dimensional shapes, the apparatus comprising:
   input means for receiving 3-dimensional image data about a shape of an object targeted for shape search;
   an acquisition module for acquiring a 2-dimensional image data group about the shape of the object represented by the 3-dimensional image data;
   storage means for previously storing 3-dimensional image data about shapes of a plurality of objects, and 2-dimensional image data groups about the shapes of the plurality of objects represented by the 3-dimensional image data;
   a comparison and search module for searching for 3-dimensional image data corresponding to a previously stored 2-dimensional image data group that is similar to the acquired 2-dimensional image data within a predetermined range, by comparing respective data of the 2-dimensional image data group, which are acquired by the acquisition module, with respective data of the 2-dimensional image data groups, which are previously stored in the storage means;
   output means for displaying the 3-dimensional image data found by the comparison and search module to an outside; and
   control means for controlling the input means, the acquisition module, the storage means, the comparison and search module, and the output means,
   wherein the acquisition module divides the shape on a basis of a predetermined reference plane, fills inner portions of the sections of the divided shape with indication of a section, and acquires the 2-dimensional image data group, including a plurality of pieces of 2-dimensional image data about the filled sections.

2. The apparatus as set forth in claim 1, wherein the acquisition module acquires a 2-dimensional image data group, including planar shapes viewed at one or more points.

3. The apparatus as set forth in claim 2, wherein the acquisition module determines a direction of a longest dimension of the shape to be a first axis, a direction perpendicular to the first axis to be a second axis, and a direction perpendicular to the first and second axes to be a third axis, and acquires a 2-dimensional image data group including planar shapes depending on points at which the object is viewed from the first to third axes.

4. The apparatus as set forth in claim 3, wherein the acquisition module acquires a 2-dimensional image data group additionally including planar shapes that are acquired when the shape is viewed from a plurality of points that form predetermined angles with the first to third axes.

5. A method of searching for 3-dimensional shapes, the method comprising the steps of:

receiving 3-dimensional image data about a shape of an object targeted for shape search;

acquiring a 2-dimensional image data group about a shape of the object represented by the 3-dimensional image data;

comparing respective data of the 2-dimensional image data group, which are acquired by the acquisition module, with respective data of the 2-dimensional image data groups, which are previously stored in a predetermined database;

searching for previously stored 2-dimensional image data group that is similar to the acquired 2-dimensional image data group within a predetermined range based on comparison; and providing 3-dimensional image data that have been previously stored in the predetermined database and corresponds to the searched 2-dimensional image data group, wherein the acquisition step comprises the sub-steps of:

dividing the shape on a basis of a predetermined reference plane;

filling the inner portions of the sections of the divided shape with indication of a section; and acquiring the 2-dimensional image data group including a plurality of pieces of 2-dimensional image data about the filled sections.

6. The method as set forth in claim 5, wherein the acquisition step comprises the step of acquiring the 2-dimensional image data group including planar shapes viewed at one or more points.

7. The method as set forth in claim 6, wherein the acquisition step determines a direction of a longest dimension of the shape to be a first axis, a direction perpendicular to the first axis to be a second axis, and a direction perpendicular to the first and second axes to be a third axis, and acquires a 2-dimensional image data group including planar shapes depending on points at which the object is viewed from the first to third axes.

8. The method as set forth in claim 7, wherein the acquisition step acquires a 2-dimensional image data group additionally including planar shapes that are acquired when the shape is viewed from a plurality of points that form predetermined angles with the first to third axes.

* * * * *